United States Patent Office 3,086,027
Patented Apr. 16, 1963

---

3,086,027
19-NOR-4,9(10)-STEROIDS AND PROCESS
Melvin Perelman and Eugene Farkas, Indianapolis, Ind., assignors to Eli Lilly and Company, Indianapolis, Ind., a corporation of Indiana
No Drawing. Filed Jan. 22, 1960, Ser. No. 4,001
15 Claims. (Cl. 260—397.3)

This invention relates to a group of novel steroidal dienes and to a process for their preparation.

The compounds provided by this invention are generically described as 19-nor-$\Delta^{4,9(10)}$ steroids. They can be represented by the following formula:

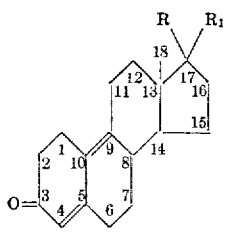

wherein R and $R_1$ are chosen from the group pairs consisting of hydrogen and hydroxyl, ethinyl and hydroxyl, vinyl and hydroxyl, methyl and hydroxyl, ethyl and hydroxyl, propyl and hydroxyl, $\alpha$-hydroxyethyl and hydrogen, and acetyl and hydrogen. Also included within the scope of this invention are the lower aliphatic esters of the hydroxyl compounds represented by the above formula.

The compounds of this invention are in general white crystalline, high-melting solids which are soluble in most organic solvents. Inasmuch as the compounds have a dienone grouping, they exhibit a characteristic absorption peak in the ultraviolet portion of the spectrum in the region of 300 to 305 m$\mu$. The compounds of this invention also show absorption characteristic of the dienone grouping in the infrared region of the spectrum. The infrared absorption occurs as two peaks; one at about 6.05$\mu$, the other at about 6.2$\mu$. Other groupings which may be present in the compounds as for example the hydroxyl, ethylene, acetylene and ester groupings, also show absorptions in the infrared region of the spectrum characteristic of the particular grouping.

The novel process provided by this invention comprises broadly a method for introducing the $\Delta^{4,9(10)}$ grouping into a 19-nor steroid. The method employed for the preparation of the novel compounds of this invention is as follows: A 3-keto-$\Delta^{5(10)}$ 19-nor steroid is brominated in a nonreacting solvent at or below 0° C. to produce a 3-keto-5,10-dibromo 19-nor steroid. The dibromo compounds is kept in contact with a pyridine base at ambient room temperature until one molecule of hydrogen bromide is eliminated, and a 3-keto-$\Delta^4$-10-bromo steroid is formed. Further treatment of the 3-keto-$\Delta^4$-10-bromo steroid either with a pyridine base or with sodium iodide in acetone selectively splits out a second molecule of hydrogen bromide, thus forming the desired $\Delta^{4,9(10)}$ dienic system. The above synthetic scheme is illustrated by the following equation in which the C and D rings of the steroid molecule together with any substituents they may bear, are represented by the symbol Z:

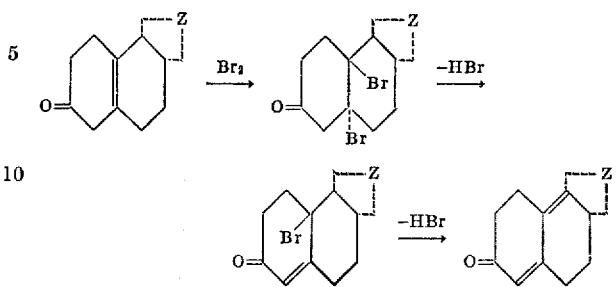

In carrying out the process of this invention, one or both of the two intermediate compounds, a 5,10-dibromo steroid and a $\Delta^4$-10-bromo steroid, can be isolated individually and then further treated chemically as specified above to form the desired $\Delta^{4,9(10)}$ steroid. Preferably, however, the reaction is carried out without isolating either of the brominated intermediates. In the preferred embodiment of our novel process, bromine is added to a 3-keto-$\Delta^{5(10)}$ 19-nor steroid in a pyridine base solvent and the 5,10-dibromo derivative thus formed is allowed to remain in contact with the pyridine base solvent until two molecules of hydrogen bromide are selectively split out and the desired 3-keto dienone is formed. Surprisingly, the elimination of two molecules of hydrogen bromide from the 3-keto-5,10-dibromo steroid does not, as would be expected, result in the predominant formation of a compound containing an aromatic A-ring with a phenolic hydroxyl at the 3-position. Rather, hydrogen bromide is selectively eliminated to give a $\Delta^{4,9(10)}$ diene.

The course of the hydrogen bromide elimination reactions which result in the formation of either the 3-keto-$\Delta^4$-10-bromo steroid or the 3-keto-$\Delta^{4,9(10)}$ steroid can be followed spectroscopically. For example, the formation of the desired 3-keto-$\Delta^{4,9(10)}$ dienone can be followed by examining an aliquot of the reaction mixture for the appearance and intensity of the 300 to 305 m$\mu$ peak in the ultraviolet region of the spectrum. The formation of either the 3-keto-$\Delta^4$-10-bromo steroid or the dienone can be also followed by infrared spectroscopy, as by noting the appearance of the absorption band or bands characteristic of a conjugated ketone or of a conjugated dienone. The fact that the 3-keto-5,10-dibromo steroid, the 3-keto-$\Delta^4$-10-bromo steroid and the 3-keto-$\Delta^{4,9(10)}$ steroid have different absorption spectra in solution greatly simplifies the procedure for isolating the 3-keto-$\Delta^4$-10-bromo steroid intermediate, since the hydrogen bromide elimination reactions can be interrupted after one and before two molecules of hydrogen bromide have been eliminated, as denoted by the appearance of peaks in the infrared or ultraviolet spectrum characteristic of the 3-keto-$\Delta^4$ grouping.

The compounds of this invention can be isolated from the reaction mixture in which they are present by any of the techniques well known to the art, for example, by removal of the pyridine solvent by evaporation, solution of the resulting residue in a mixture of ether and water, separation of the ether layer, evaporation of the ether, and recrystallization of the steroid-containing residue from an organic solvent.

In carrying out the first step of the novel process of this invention, wherein a $\Delta^{4,9(10)}$ dienic system is introduced into a 3-keto steroid, the double bond of a 3-keto-$\Delta^{5(10)}$ 19-nor steroid is brominated in a nonreacting solvent. Liquid bromine can be employed as the bromine addition agent and other bromine carriers such as phenyltrimethylammonium bromide perbromide can also be used. We prefer, however, to employ pyridine perbromide hydrobromide as the bromine addition agent since this reagent is particularly well adapted for use with a pyridine base as the reaction solvent. Pyridine bases are convenient to use in the bromine addition step since, as set forth below, they are the solvents of choice in the succeeding hydrogen bromide elimination reactions which lead to the formation of the $\Delta^{4,9(10)}$ steroid from the 5,10-dibromo steroid. In the bromination step, however, other nonreacting solvents besides pyridine bases can also be employed, such as, for example, carbon tetrachloride, methylene dichloride, ethylene dichloride, ethyl acetate and the like.

In the second step of the novel process of this invention in which hydrogen bromide is split out of a 5,10-dibromo steroid to give a $\Delta^4$-10-bromo steroid, a pyridine base is necessarily used as the solvent since other nonreactive solvents fail to give the desired product.

In the third step of our novel process wherein hydrogen bromide is eliminated from a $\Delta^4$-10-bromo steroid to give a $\Delta^{4,9(10)}$ dienic system in a 19-nor steroid, a pyridine base is preferably used as a solvent. The pyridine base also aids in the elimination of hydrogen bromide from the $\Delta^4$-10-bromo compound. The alternative method of selectively removing hydrogen bromide from a $\Delta^4$-10-bromo steroid involves the treatment of the steroid with sodium iodide in a nonaqueous solvent such as acetone.

A number of pyridine bases can be employed as solvents in any of the above reaction steps, including both the bromination step and the two hydrogen bromide elimination steps. Exemplary of the useful pyridine bases are $\alpha$-picoline, $\beta$-picoline, $\gamma$-picoline, $\alpha$-ethylpyridine, $\beta$-ethylpyridine, $\gamma$-ethylpyridine, 2,4,5-collidine, 2,4-lutidine, 2,5-lutidine and the like. While the above pyridine bases are each fully operative, the pyridine base of choice for use as a solvent in any of the above reaction steps is pyridine itself.

The temperature of the reaction steps comprising the process of this invention should be carefully controlled. For example, the bromination step, wherein a 3-keto-5,10-dibromo steroid is prepared, is preferably carried out at about 0° C. or below, especially if the 5,10-dibromo steroid is to be isolated as such. Temperatures as high as 5° C. are operative for this reaction, but at temperatures of 10° C. or higher, hydrogen bromide is spontaneously eliminated from the 5,10-dibromo compound and undesired steroid by-products containing an aromatic A-ring are formed. The two hydrogen bromide elimination steps are customarily carried out at temperatures in the range of 20° C. to 30° C. and can therefore readily be carried out at ambient room temperature. Lower temperatures than 20° C. are operative, but the reactions are, of course, slower. Temperatures higher than 30° C. are also operative but tend to lead in some cases to undesirably large quantities of aromatic by-products.

If the alternative reaction for accomplishing the final step of our novel process is to be used (the reaction wherein the 3-keto-$\Delta^4$-10-bromo steroid is isolated and hydrogen bromide is eliminated from this intermediate by means of sodium iodide in acetone), the reaction conditions for this elimination step are essentially the same as when a pyridine base is used to aid in the elimination of hydrogen bromide from the same compound.

The length of time required for the complete elimination of two molecules of hydrogen bromide from a 5,10-dibromo steroid to yield the desired 3-keto-$\Delta^{4,9(10)}$ compound varies with the nature of the substituents on the steroid ring. With some compounds, as for example 19-nor-5,10-dibromandrostan-17$\beta$-ol-3-one, a period of from 15 to 20 minutes suffices, whereas nearly 24 hours is required for others, such as 17$\alpha$-ethinyl-19-nor-5,10-dibromandrostan-17$\beta$-ol-3-one. The course of the hydrogen bromide elimination reactions can be followed quite exactly by utilizing the absorption spectra differences between the starting intermediate and final compounds, as previously set forth.

When a $\Delta^{4,9(10)}$ compound is to be prepared which contains an isolated double bond, as for example, a vinyl group as in 17$\alpha$-vinyl-19-nor-4,9(10)-androsten-17$\beta$-ol-3-one, an additional process step may be necessary since both the isolated double bond and the $\Delta^{5(10)}$ double bond in the starting material can add bromine. The additional process step is then required to regenerate the original isolated double bond, after the 5,10-dibromo intermediate is doubly dehydrobrominated to give the $\Delta^{4,9(10)}$ dienic system. This debromination of the brominated isolated double bond can be readily accomplished by the action of sodium iodide in acetone. If an intermediate $\Delta^4$-10-bromo derivative is isolated as such, in the manner previously set forth, sodium iodide in acetone can be employed as both the dehydrobrominating agent for producing the $\Delta^{9(10)}$ double bond and as the debrominating agent for regenerating the original double bond. In this instance no additional process step is necessary.

Various other substituent groups can also be present in one or more of the otherwise unoccupied positions in the 3-keto-$\Delta^{4,9(10)}$ 19-nor steroids of this invention, for example halogen atoms, hydroxyl groups, ketone groups, alkyl groups and the like. Illustratively, our novel $\Delta^{4,9(10)}$ steroids can contain an 11-keto or hydroxy group, a 21-hydroxy group, a 6-methyl or 6-fluoro group, a 16-hydroxy group, a 2-methyl group, a 16-methyl group and the like.

As set forth above, lower aliphatic acyl derivatives of hydroxylated 3-keto-$\Delta^{4,9(10)}$ 19-nor steroids are included within the scope of this invention. For example, 17 and 20 hydroxyl derivatives of the dienones of this invention can be acylated with various agents, such as acetyl chloride, acetic anhydride, $\omega$-cyclopentyl propionic anhydride, butyric anhydride and the like to form the corresponding lower aliphatic ester derivative. Thus, the process of this invention can be employed to prepare compounds other than those prepared directly by bromination and dehydrobromination of a 3-keto-$\Delta^{5(10)}$ steroid.

The following compounds exemplify those coming within the scope of this invention:

19-nor-4,9(10)-pregnadien-11$\beta$-ol-3,20-dione,
17$\alpha$-propyl-19-nor-4,9(10)-androstadien-17$\beta$-ol-3-one,
19-nor-4,9(10)-androstadien-17$\beta$-ol-3-one propionate,
17$\alpha$-ethinyl-19-nor-4,9(10)-androstadien-17$\beta$-ol-3-one,
17$\alpha$-methyl-19-nor-4,9(10)-androstadien-17$\beta$-ol-3-one acetate,
6$\alpha$-fluoro-19-nor-4,9(10)-pregnadien-11$\beta$-ol-3,20-dione,
19-nor-4,9(10)-androstadiene-3,17$\beta$-diol diacetate,
19-nor-4,9(10)-pregnadient-20-ol-3-one acetate
and the like.

The compounds of this invention are characterized by anabolic activity. Many of them also show progestational and anti-estrogenic activities. For example, 17$\alpha$-ethyl-19-nor-4,9(10-androstadien-17$\beta$-ol-3-one,
17$\alpha$-methyl-19-nor-4,9(10)-androstadien-17$\beta$-ol-3-one,
19-nor-4,9(10)-androstadien-17$\beta$-ol-3-one and
19-nor-4,9(10)-androstadien-17$\beta$-ol-3-one acetate, like testosterone, display a highly potent anabolic activity, but yet unlike testosterone do not possess a parallel androgenic activity. In addition to anabolic activity, the compounds of this invention exhibit other physiological effects. For example, 17$\alpha$-methyl-19-nor-4,9(10)- androstadien-17β-ol-3-one is an extremely potent antiestrogenic substance, and 17α-ethinyl-19-nor-4,9(10)-androstadien-17β-ol-3-one is an orally active progestational agent which reduces fecundity in animals.

This invention is further illustrated by the following specific examples:

EXAMPLE 1

*Preparation of 19-Nor-4,9(10)-Androstadien-17β-Ol-3-One*

A solution of 7.165 g. of 19-nor-5(10)-androsten-17β-ol-3-one [prepared by the method of Wilds and Nelson, J. Am. Chem. Soc. 75, 5366 (1953)] in 200 ml. of anhydrous redistilled pyridine was chilled to about 0° C. and 8.5 g. of pyridine perbromide hydrobromide were gradually added to the solution with stirring over a period of about one hour. Stirring was continued for a second hour at a temperature of 0° C., and for a third hour at ambient room temperature. The reaction mixture was diluted with 400 ml. of water and the aqueous mixture was extracted three times with a 50–50 methylene chloride-ether solvent mixture. The extracts were combined and were washed successively three times with 200 ml. of 1 N hydrochloric acid, once with 100 ml. of 1 N sodium hydroxide, three times with 200 ml. of water and once with 150 ml. of a saturated aqueous sodium chloride solution. The washes were discarded. The organic layer was separated and was dried. The solvents were removed by evaporation in vacuo leaving a yellowish, solid residue. Two recrystallizations of the residue from aqueous acetone yielded about 3.45 g. of white crystalline 19-nor-4,9(10)-androstadien-17β-ol - 3 - one. The compound melted at about 175–178° C. Its ultraviolet spectrum in ethanol exhibited an absorption peak at 304 mμ with an extinction coefficient, $\epsilon=20,400$.

Chromatography of the mother liquor over 100 g. of Woelm alumina (activity III) using a mixture of benzene and petroleum ether as a developing solvent, yielded an additional 1.5 g. of the compound. The two crystalline fractions were combined, and after threefold recrystallization from aqueous acetone, yielded purified 19-nor-4,9(10)-androstadien-17β-ol-3-one melting at about 187–188° C. An ultraviolet spectrum of the compound in ethanol exhibited an absorption peak at 304 mμ with a molar extinction coefficient, $\epsilon=20,400$.

*Analysis.*—Calc.: C, 79.37; H, 8.88. Found: C, 79.28; H, 9.01. $[\alpha]_d=-290.2°$ (c.=1.0 in chloroform).

The above preparation was repeated except that liquid bromine was added to the pyridine solution of 19-nor-5(10)-androsten-17β-ol-3-one instead of pyridine perbromide hydrobromide. 19-nor-4,9(10)-androstadien-17β-ol-3-one was obtained as before.

EXAMPLE 2

*Preparation of 19-Nor-4,9(10)-Androstadien-17β-Ol-3-One Acetate*

A solution was prepared containing 470 mg. of 19-nor-4,9(10)-androstadien-17β-ol-3-one in 10 ml. of anhydrous pyridine. Five ml. of acetic anhydride were added and the reaction mixture was allowed to stand for about 16 hours at ambient room temperature. The reaction mixture was diluted with 100 ml. of a water-ice mixture and the aqueous mixture was extracted with 300 ml. of ether. The ethereal extract containing 19-nor-4,9(10)-androstadien-17β-ol-3-one acetate formed in the above reaction was washed successively with three 100 ml. portions of 1 N hydrochloric acid, one 100 ml. portion of 1 N sodium hydroxide, three 100 ml. portions of water and one 100 ml. portion of a saturated sodium chloride solution. The ether extract was dried and the solvent removed therefrom by evaporation in vacuo leaving a residue comprising a colorless oil which crystallized slowly on standing. Two recrystallizations from a 30–45° C. petroleum ether solvent yielded 19-nor-4,9(10)-androstadien-17β-ol-3-one acetate melting at 107° C. An ultraviolet spectrum of this compound in ethanol exhibited an absorption peak at 303 mμ with a molar extinction coefficient, $\epsilon=20,400$.

*Analysis.*—Calc.: C, 76.40; H, 8.34. Found: C, 76.15; H, 8.47. $[\alpha]_d=-237.1°$ (c.=1.025 in chloroform).

Other lower aliphatic acyl anhydrides, for example, propionic anhydride and butyric anhydride can be employed in place of acetic anhydride in the above example to yield 19-nor-4,9(10)-androstadien-17β-ol-3-one propionate and 19-nor-4,9(10)-androstadien-17β-ol - 3 - one butyrate respectively.

EXAMPLE 3

*Preparation of 17α-Ethinyl-19-Nor-4,9(10)-Androstadien-17β-Ol-3-One*

Following the procedure of Example 1, 0.54 g. of 17α-ethinyl-19-nor-5(10)-androsten-17β-ol-3-one (prepared by the method of Colton, U.S. Patent No. 2,725,389) were dissolved in 10 ml. of anhydrous redistilled pyridine. The solution was chilled to about 0° C. in an ice bath and 0.61 g. of pyridine perbromide hydrobromide were added over a period of about 15 minutes. The reaction mixture was allowed to stand for one hour at about 0° C. and at ambient room temperature for about two hours. 17α-ethinyl-19-nor-4,9(10)-androstadien-17β-ol-3-one formed in the above reaction was purified by the procedure of Example 1 except that the reaction mixture was diluted with water containing two percent sodium thiosulfate instead of just water. Purified 17α-ethinyl-19-nor-4,9(10)-androstadien-17β-ol-3-one was obtained as a non-crystalline residue which, however, crystallized upon the addition of ether. The crystals were collected, were dissolved in a 1:1 ether-benzene solvent mixture, and the solution was chromatographed over 10 g. of neutral alumina using the same solvent as an eluant. Fractions eluted from the column with the above solvent mixture were combined and were crystallized by evaporation of the solvent. The crystals were collected and were recrystallized from acetone yielding purified 17α-ethinyl-19-nor-4,9(10)-androstadien-17β-ol-3-one melting at about 154–155° C. An ultraviolet spectrum of the compound in ethanol exhibited an absorption peak at 304 mμ with a molar extinction coefficient, $\epsilon=19,800$.

*Analysis.*—Calc.: C, 81.04; H, 8.16. Found: C, 81.43; H, 8.28. $[\alpha]_d=-321.8°$ (c.=1.0 in chloroform).

EXAMPLE 4

*Preparation of 17α-Vinyl-19-Nor-4,9(10)-Androstadien-17β-Ol-3-One*

To a solution containing 1.0 g. of 3-methoxy-17α-ethinyl-19-nor-2,5(10)-androstadien-17β-ol (described in U.S. Patent 2,725,389, issued Nov. 25, 1955) in 20 ml. of anhydrous reagent grade pyridine were added 0.03 g. of palladium-on-barium carbonate catalyst. The mixture was hydrogenated in a microhydrogenation apparatus according to the procedure of Sandoval et al., J. Am. Chem. Soc., 77, 150 (1955). After the theoretical quantity of hydrogen had been absorbed, the reaction mixture was removed from the hydrogenation apparatus and the filtrate was evaporated to dryness in vacuo. The resulting residue comprising 3-methoxy-17α-vinyl-19-nor-2,5(10)-androstadien-17β-ol was recrystallized from methanol and melted at about 147–149° C.

To a solution containing 0.2 g. of 3-methoxy-17α-vinyl-19-nor-2,5(10)-androstadien 17β-ol prepared as above in 18 ml. of anhydrous methanol were added about 0.25 g. of oxalic acid in 2 ml. of water and the resulting mixture was allowed to stand at about 25° C. for 40 minutes. It was then poured into 100 ml. of water and 17α-vinyl-19-nor-5(10)-androsten-17β-ol-3-one formed in the above reaction separated and was extracted with ether. The ether extract was separated, was repeatedly washed with a saturated aqueous sodium bicarbonate solution until the oxalic acid had been removed and was then washed with 100 ml. of a saturated sodium chloride solution. The ether layer was separated, was dried and the ether was evaporated in vacuo. The resulting residue comprising 17α-vinyl - 19 - nor-5(10)-androsten-17β-ol-3-one was recrystallized from methanol and melted at about 134–137° C.

About 0.35 g. of 17α-vinyl-19-nor-5(10)-androsten-17β-ol-3-one were dissolved in 8 ml. of pyridine and the solution was cooled to about 0° C. About 0.75 g. of pyridine perbromide hydrobromide were added and the reaction mixture was allowed to remain at about 0° C. for 50 minutes and then at ambient room temperature for about 4 hours. The reaction mixture was poured into 100 ml. of water and 17α-(1,2-dibromovinyl)-19-nor-4,9(10)-androstadien-17β-ol-3-one thus formed was extracted with methylene dichloride. The organic layer was separated and was washed successively with 5 percent aqueous hydrochloric acid and with a saturated aqueous sodium chloride solution. The organic layer was separated, was dried and the solvent was removed by evaporation in vacuo. The residue comprising the above dibromovinyl compound crystallized upon addition of ether. The compound had the following absorption peak in the ultraviolet spectrum: $\lambda_{max}$ 304=15,000.

The 17α-(1,2-dibromovinyl)-19-nor-4,9(10)-androstadien-17β-ol-3-one prepared by the above procedure was dissolved in 20 ml. of anhydrous acetone to which was added an excess of sodium iodide crystals. The reaction mixture was heated at refluxing temperature for about 4 hours. 40 ml. of a dilute sodium thiosulfate solution were added. 17α - vinyl - 19 - nor-4,9(10)-17β-ol-3-one formed in the above reaction separated and was extracted with ether. The ether extract was separated, was washed with a saturated aqueous sodium chloride solution and was dried. The ether was evaporated in vacuo. The resulting residue was dissolved in a minimum amount of a 2:1 benzene-hexane solvent mixture and was chromatographed over 30 g. of neutral alumina. The chromatography was developed with 250 ml. of the same solvent mixture followed by 350 ml. of benzene and by 200 ml. of 10 percent ether in benzene. 17α-vinyl-19-nor-Δ$^{4,9(10)}$ androstadien-17β-ol-3-one was eluted from the column by 700 ml. of 25 percent ether in benzene. 17α-vinyl-19-nor-Δ$^{4,9(10)}$ androstadien-17β-ol-3-one thus purified melted at about 150–152° C. after recrystallization from methanol. Its ultraviolet absorption spectrum showed the usual high absorption peak at 306 mμ.

EXAMPLE 5

*Preparation of 17α-Ethinyl-19-Nor-4,9(10)-Androstadien-17β-Ol-3-One Acetate*

Following the procedure of Example 2, 0.05 g. of 17α-ethinyl - 19 - nor-4,9(10)-androstadien-17β-ol-3-one was acetylated with acetic anhydride in pyridine to yield 17α-ethinyl-19-nor-4,9(10)-androstadien-17β-ol-3-one acetate. The residue obtained after evaporation of the solvents was dissolved in a 5:1 benzene-hexane solvent mixture and the resulting solution was chromatographed over 5 g. of neutral alumina. The combined eluates obtained when benzene was used as an eluant yielded 17α-ethinyl-19-nor-4,9(10)-androstadien-17β-ol-3-one acetate.

EXAMPLE 6

*Preparation of 17α-Ethyl-19-Nor-4,9(10)-Androstadien-17β-Ol-3-One*

Following the procedure of Example 1, 0.7 g. of 17α-ethyl - 19 - nor - 5(10) - androsten - 17β - ol - 3 - one [prepared by the method of Colton, J. Am. Chem. Soc., 79, 1123 (1957)] were brominated with 0.82 g. of pyridine perbromide hydrobromide in 14 ml. of pyridine solution at about 0° C. After the addition of the pyridine perbromide hydrobromide had been completed, the reaction mixture was stirred for one additional hour at about 0° C. and then at ambient room temperature for about one and one-half hours. 17α-ethyl-19-nor-4,9(10)-androstadien-17β-ol-3-one thus prepared was isolated by the procedure of Example 1 and the compound was purified by chromatography over 30 g. of neutral alumina (Woelm I). The compound was placed on the column from a benzene solution. 17α-ethyl-19-nor-4,9(10)-androstadien-17β-ol-3-one was eluted from the column with a 1:9 ether-benzene eluant. Evaporation of the eluate gave a residue which, upon crystallization from an ether-hexane solvent mixture, yielded 17α-ethyl-19-nor-4,9(10)-androstadien-17β-ol-3-one melting at about 115–120° C.

17α - propyl - 19 - nor - 4,9(10) - androstadien - 17β-ol-3-one can be prepared according to the above procedure by using 17α-propyl-19-nor-5(10)-androsten-17β-ol-3-one in place of the corresponding 17α-ethyl compound. The 17α-propyl compound is also prepared by the method of Colton—loc. cit.

EXAMPLE 7

*Preparation of 17α-Methyl-19-Nor-4,9(10)-Androstadien-17β-Ol-3-One*

Following the procedure of Example 1, 1.1 g. of 17α-methyl - 19 - nor - 5(10) - androsten - 17β - ol - 3 - one [described in U.S. Patent 2,905,676, issued Sept. 22, 1959, and prepared by the method of Djerassi et al., J. Am. Chem Soc., 76, 4092 (1954)] were dissolved in 25 ml. of anhydrous pyridine. 1.22 g. of pyridine perbromide hydrobromide were added to the solution at a temperature of about 0° C. and the reaction mixture was kept at that temperature for about one and one-quarter hours. The reaction mixture was allowed to warm up to ambient room temperature where it was maintained for an additional hour. 17α-methyl-19-nor-4,9(10)-androstadien-17β-ol-3-one thus prepared was isolated by the procedure of Example 1. The compound was purified by chromatography over 30 g. of neutral alumina. 17α - methyl - 19 - nor - 4,9(10) - androstadien-17β-ol-3-one was placed on the column from a 2:1 benzene-hexane solvent mixture, and was eluted therefrom with a 1:1 ethyl acetate-benzene solvent mixture. The combined eluate fractions were evaporated to dryness and the resulting residue was rechromatographed over alumina using benzene to place the compound on the column and a 1:1 ethyl acetate-benzene solvent mixture to elute the compound from the column. Evaporation of the eluting solvent yielded a residue which crystallized from pentane. Crystalline 17α-methyl-19-nor-4,9(10)-androstadien-17β-ol-3-one thus prepared melted at about 104–106° C.

EXAMPLE 8

*Preparation of 19-Nor-4,9(10)-Pregnadien-3,20-Dione*

To one l. of liquid ammonia in a two-l. flask was added a solution prepared by dissolving 900 mg. of 17β-(α - hydroxyethyl) - 1,3,5(10) - estratriene β - methoxy ether [prepared by the method of Djerassi et al., J. Am. Chem. Soc., 75, 4440 (1953)] in about 220 ml. of anhydrous ether. About 8 g. of pieces of lithium ribbon were added slowly and the consequent mixture was stirred for about two hours. A mixture of 90 ml. of anhydrous ethanol and 90 ml. of anhydrous ether was next added, followed by another 20 ml. of anhydrous ethanol. The reaction mixture was allowed to stand overnight at ambient room temperature during which time the ammonia evaporated. About 200 ml. of water were added slowly to the ethereal residue. A white precipitate separated during the addition. The mixture was stirred for an hour, was cooled and was extracted with about 600 ml. of an ether-ethyl acetate solvent mixture. About 200 ml. additional water were added to dissolve the precipitated salts and the aqueous layer was extracted twice more with 200 ml. of an ether-ethyl acetate solvent mixture. The extracts were combined, were washed with 300 ml. of water and were dried. The solvent was evaporated in vacuo and the resulting residue crystallized upon the addition of acetone to yield 3-methoxy-19-nor-2,5(10)-pregnadien-20-ol. The crystals were separated by filtration and were dissolved in about 70 ml. of methanol. A solution of 750 mg. of oxalic acid monohydrate in 8 ml. of water was added to the reaction mixture which was allowed to remain at ambient room temperature for 60 minutes. 200 ml. of ether were added, the ether layer was separated and was washed successively with 200 ml. of 10 percent sodium bicarbonate, 200 ml. of water, and 100 ml. of a saturated sodium chloride solution. The ether extract was dried and the ether evaporated therefrom in vacuo, yielding as a residue a yellow viscous oil comprising 19-nor-5(10)-pregnen-20-ol-3-one. About 400 mg. of this oil were treated with 400 mg. of pyridine perbromide hydrobromide in pyridine solution at about 0° C. by the method of Example 1. The reaction mixture was stirred for about 20 minutes at about 0° C. and was then allowed to stand at ambient room temperature for another 16 hours. 19-nor-4,9(10)-pregnadien-20-ol-3-one thus prepared was isolated by the procedure of Example 1 and melted at about 129–132° C.

300 mg. of 19 - nor - 4,9(10) - pregnadien - 20 - ol-3-one were added to a mixture of 400 mg. of chromium trioxide and 3 ml. of cold anhydrous pyridine. The reaction mixture was maintained at about 4° C. for 18 hours, and was then diluted with water. 19-nor-4,9(10)-pregnadiene-3,20-dione formed in the above reaction was extracted with a methylene dichloride-ether solvent mixture. The extract was separated and was dried. Evaporation of the solvents in vacuo yielded 19-nor-4,9(10)-pregnadiene-3,20-dione as a residue. An ultraviolet spectrum of the compound in ethanol exhibited an absorption peak at 304 m$\mu$ and an infrared absorption spectrum of the compound showed peaks for a non-conjugated carbonyl (5.86 m$\mu$) and for the conjugated 3-keto-$\Delta^{4,9(10)}$ dienone system (6.0; 6.18 m$\mu$) in conformance with the expected structural characteristics of the compound.

EXAMPLE 9

*Preparation of 17α-Ethinyl-19-Nor-5α,10β-Dibromandrostan-17β-Ol-3-One*

A solution was prepared containing 0.2 g. of 17α-ethinyl-19-nor-5(10)-androsten-17β-ol-3-one dissolved in 6 ml. of anhydrous reagent grade pyridine. The solution was placed in a flask and was cooled to about 0° C. To the chilled solution were added 0.23 g. of pyridine perbromide hydrobromide in several portions. The reaction mixture was allowed to stand at about 0° C. for about one-quarter hour and was then diluted with 150 ml. of water containing a small amount of sodium thiosulfate. 17α - ethinyl - 19 - nor-5α,10β-dibromandrostan-17β-ol-3-one formed in the above reaction was extracted from the aqueous mixture with 300 ml. of a 1:1 ether-methylene dichloride solvent mixture. The extract was washed with 150 ml. of saturated sodium chloride solution and was dried. Evaporation of the solvents in vacuo left a residue which, upon the addition of ether, yielded crystals of 17α - ethinyl-19-nor-5α,10β-dibromandrostan-17β-ol-3-one, melting with decomposition at about 125° C.

*Analysis.*—Calc.: Br, 34.96. Found: Br, 34.62.

Seven-hundredths g. of 17α-ethinyl-19-nor-5α,10β-dibromandrostan-17β-ol-3-one were dissolved in 7 ml. of anhydrous redistilled pyridine and the solution was allowed to stand at ambient room temperature for about 60 hours. During this time, 17α-ethinyl-19-nor-5(10)-dibromandrosten-17β-ol-3-one eliminated two molecules of hydrobromic acid to yield 17α-ethinyl-19-nor-4,9(10)-androstadien-17β-ol-3-one which was isolated by the procedure of Example 1.

EXAMPLE 10

*Preparation of 19-Nor-5α,10β-Dibromandrostan-17β-Ol-3-One*

Following the procedure of Example 9, 0.25 g. of 19-nor-5(10)-androsten-17β-ol-3-one were dissolved in 12 ml. anhydrous redistilled pyridine and the resulting solution was cooled to about 0° C. Twenty-nine hundredths g. of pyridine perbromide hydrobromide were added and the mixture was allowed to stand at about 0° C. for one-half hour. Following the procedure outlined in Example 9, 19-nor-5α,10β-dibromandrostan-17β-ol-3-one was isolated from the reaction mixture as a residue after evaporation of the extraction solvents. The residue crystallized upon addition of ether to yield crystalline 19 - nor - 5α,10β - dibromandrostan 17β-ol-3-one which melted with decomposition at about 121–130° C.

A reaction mixture was prepared by dissolving 0.14 g. of 19-nor-5α,10β-dibromandrostan-17β-ol-3-one in 8 ml. of anhydrous redistilled pyridine. The reaction mixture was allowed to stand at ambient room temperature for about 50 minutes. 19-nor-4,9(10)-androstadien-17β ol-3-one thus formed was isolated and purified by the procedure of Example 1.

EXAMPLE 11

*Preparation of 19-Nor-10β-Bromo-4-Androsten-17β-Ol-3-One*

A solution was prepared containing 0.14 g. of 19-nor-5α,10β-dibromandrostan-17β-ol-3-one in 8 ml. of anhydrous redistilled pyridine. The solution was allowed to stand at ambient room temperature for 11 minutes during which time the 19-nor-5α,10β-dibromandrostan-17β-ol-3-one split out one molecule of hydrogen bromide to form 19 - nor - 10β - bromo-4-androsten-17β-ol-3-one. The reaction mixture was poured into 150 ml. of water and was extracted with three successive 60 ml. portions of ethylene dichloride. The ethylene dichloride extracts were combined and were washed successively with 250 ml. of 10 percent hydrochloric acid and 150 ml. of a saturated sodium chloride solution. The ethylene dichloride layer was separated, was dried and the solvent was removed by evaporation in vacuo leaving 19-nor-10β-bromo-4-androsten-17β-ol-3-one as a residue. The residue crystallized upon the addition of ether to yield crystalline 19-nor-10β-bromo-4-androsten-17β-ol-3-one which was separated by filtration. The compound melted with decomposition at about 130° C. Its ultraviolet spectrum in ethanol showed a peak at about 241 m$\mu$ with a molar extinction coefficient, $$\epsilon = 13,500$$

*Analysis.*—Calc.: Br, 22.59. Found: Br, 22.47.

A solution was prepared by dissolving 0.03 g. of 19-nor-10β-bromo-4-androsten-17β-ol-3-one in 6 ml. of acetone. About 0.4 g. of reagent grade sodium iodide were added to the solution which was allowed to stand at ambient room temperature for about 20 hours. The reaction mixture was diluted with about 60 ml. of water containing 2 percent sodium thiosulfate. 19-nor-4,9(10)-androstadien-17β-ol-3-one formed in the above reaction was extracted from the aqueous mixture with three 40 ml. portions of methylene dichloride. The organic extracts were combined, were washed with 100 ml. of a saturated sodium chloride solution and were dried. Evaporation of the solvents in vacuo yielded 19-nor-4,9(10)-androstadien-17β-ol-3-one having the characteristic dienone absorption in the ultraviolet region of the spectrum at 300–305 m$\mu$.

Reaction of 19-nor-10β-bromo-4-androsten-17β-ol-3-one with pyridine at ambient room temperature also yielded 19-nor-4,9(10)-androstadien-17β-ol-3-one.

EXAMPLE 12

*Preparation of 17α-Ethinyl-19-nor-10β-Bromo-4-Androsten-17β-Ol-3-One*

Following the procedure of Example 11, 17α-ethinyl-19-nor-5α,10β-dibromandrostan-17β-ol-3-one was converted to 17α-ethinyl-19-nor-10β-bromo-4-androsten-17β-ol-3-one which melted at about 110–118° C. Reaction of this compound with pyridine at ambient room temperature yielded 17α-ethinyl-19-nor-4,9(10)-androstadien-17β-ol-3-one.

We claim:

1. A compound represented by the following formula:

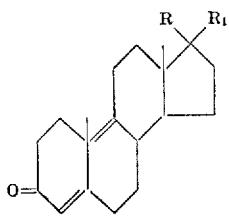

wherein R and R₁ are chosen from the group pairs consisting of hydrogen and hydroxyl, ethinyl and hydroxyl, vinyl and hydroxyl, methyl and hydroxyl, ethyl and hydroxyl, propyl and hydroxyl, α-hydroxyethyl and hydrogen, and acetyl and hydrogen.

2. 17α-ethinyl-19-nor-4,9(10)-androstadien-17β-ol-3-one.

3. 17α-ethyl-19-nor-4,9(10)-androstadien-17β-ol-3-one.

4. 17α-methyl-19-nor-4,9(10)-androstadien-17β-ol-3-one.

5. 19-nor-4,9(10)-pregnadiene-3,20-dione.

6. 17α-vinyl-19-nor-4,9(10)-androstadiene-17β-ol-3-one.

7. A method of introducing a $\Delta^{4,9(10)}$ dienic system into a 3-keto-$\Delta^{5(10)}$-nor-steroid which comprises brominating said 3-keto-$\Delta^{5(10)}$ steroid to form a 3-keto-5α,10β-dibromo steroid and then removing two molecules of hydrogen bromide from the 3-keto-5α,10β-dibromo steroid in the presence of a pyridine base, thus forming a steroid having a $\Delta^{4,9(10)}$ dienic system.

8. A method of introducing a $\Delta^{4,9(10)}$ dienic system into a 3-keto-$\Delta^{5(10)}$-nor-steroid which comprises brominating said 3-keto-$\Delta^{5(10)}$ steroid to form a 3-keto-5α-10β-dibromo steroid, removing two molecules of hydrogen bromide from the said 3-keto-5α,10β-dibromo steroid in the presence of a pyridine base and then isolating the said steroid having a $\Delta^{4,9(10)}$ dienic system.

9. The process of claim 8 in which pyridine perbromide hydrobromide is employed to brominate the 3-keto-$\Delta^{5(10)}$ steroid.

10. The process of claim 8 in which the pyridine base is pyridine.

11. The process which comprises brominating a 3-keto-$\Delta^{5(10)}$ steroid with pyridine perbromide hydrobromide at about 0° C. in pyridine solution, thus forming a 3-keto-5α,10β-dibromo steroid and then allowing the reaction mixture containing the 3-keto-5α,10β-dibromo steroid to remain at ambient room temperature whereupon the 3-keto-5α,10β-dibromo steroid is converted to a 3-keto-$\Delta^{4,9(10)}$ steroid.

12. The process which comprises brominating a 3-keto-$\Delta^{5(10)}$ steroid, isolating the thus formed 3-keto-5α,10β-dibromo steroid, and then reacting said 3-keto-5α,10β-dibromo steroid with a pyridine base to form a 3-keto-$\Delta^{4,9(10)}$ steroid.

13. The process of preparing a 3-keto-$\Delta^{4,9(10)}$ steroid which comprises brominating a 3-keto-$\Delta^{5(10)}$ steroid, isolating the thus formed 3-keto-5α,10β-dibromo steroid, reacting said 3-keto-5α,10β-dibromo steroid with a pyridine base at ambient room temperature, interrupting said reaction after only one molecule of hydrogen bromide has been eliminated from the 3-keto-5α,10β-dibromo steroid, isolating the thus formed 3-keto-10β-bromo-$\Delta^4$ steroid and then reacting said 3-keto-10β-bromo-$\Delta^4$ steroid with a pyridine base until a second molecule of hydrogen bromide is eliminated, thus forming a 3-keto-$\Delta^{4,9(10)}$ steroid.

14. A compound represented by the following formula:

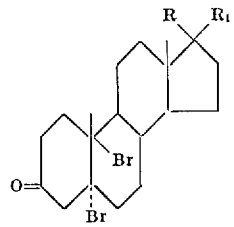

wherein R and R₁ are chosen from the group pairs consisting of hydrogen and hydroxyl, ethinyl and hydroxyl, vinyl and hydroxyl, methyl and hydroxyl, ethyl and hydroxyl, propyl and hydroxyl, α-hydroxyethyl and hydrogen, and acetyl and hydrogen.

15. A compound of the formula:

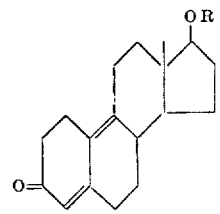

wherein R is lower alkanoyl.

References Cited in the file of this patent

UNITED STATES PATENTS 2,729,654   Colton _____ Jan. 3, 1956

UNITED STATES PATENT OFFICE
CERTIFICATE OF CORRECTION

Patent No. 3,086,027                  April 16, 1963

Melvin Perelman et al.

It is hereby certified that error appears in the above numbered patent requiring correction and that the said Letters Patent should read as corrected below.

Column 1, lines 55 and 56, for "compounds" read -- compound --; column 2, lines 3 to 15, the equation should appear as shown below instead of as in the patent:

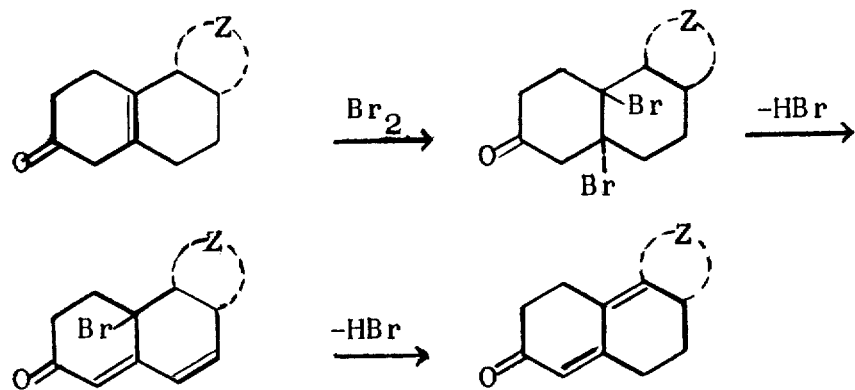

column 4, line 61, for "pregnadient" read -- pregnadien --; line 66, for "4,9(10-" read -- 4,9(10)- --; column 6, line 36, after "androstadien" insert a hyphen; column 8, line 59, for "220" read -- 200 --; column 11, lines 15 to 23, the structural formula should appear as shown below instead of as in the patent:

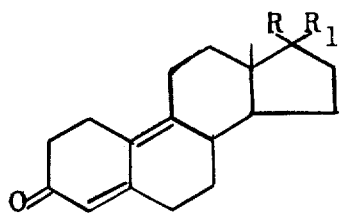

line 45, for "$\Delta^{4,9(10)})$" read -- $\Delta^{4,9(10)}$ --; line 48, for "5α-10β-" read -- 5α,10β- --;

3,086,027 column 12, lines 27 to 35, the structural formula should appear as shown below instead of as in the patent:

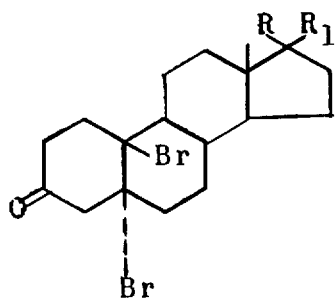

Signed and sealed this 26th day of November 1963.

(SEAL)
Attest:
ERNEST W. SWIDER

ATTESTING OFFICER

EDWIN L. REYNOLDS
Acting Commissioner of Patents